United States Patent [19]

Okamoto

[11] Patent Number: 4,499,533
[45] Date of Patent: Feb. 12, 1985

[54] POWER SUPPLY APPARATUS

[75] Inventor: Futoshi Okamoto, Hirakata, Japan

[73] Assignee: Matsushita Electric Works, Ltd., Kadoma, Japan

[21] Appl. No.: 471,525

[22] Filed: Mar. 2, 1983

[30] Foreign Application Priority Data

Sep. 14, 1982 [JP] Japan .............................. 57-159938

[51] Int. Cl.³ .............................................. H02N 7/06
[52] U.S. Cl. .................................... 363/126; 315/232; 315/253; 307/11
[58] Field of Search ............... 363/125, 126, 127, 128, 363/37; 315/312, 314, 250, 252, 253, 232; 307/11, 12, 30, 36, 317 R, 321

[56] References Cited

U.S. PATENT DOCUMENTS

| 3,733,541 | 5/1973 | Elms | 363/37 |
| 3,987,356 | 10/1976 | Steigerwald | 363/44 |
| 4,193,111 | 3/1980 | Wester | 363/126 |
| 4,412,277 | 10/1983 | Mitchell | 363/127 |

FOREIGN PATENT DOCUMENTS 904158 2/1982 U.S.S.R. ............................... 363/37

Primary Examiner—William M. Shoop
Assistant Examiner—Judson H. Jones
Attorney, Agent, or Firm—Staas & Halsey

[57] ABSTRACT

A power supply apparatus is structured such that the output of an alternating current voltage source (1) is connected to the input of a rectifying circuit (2), a series connection of a first smoothing capacitor (3a), a diode (15) and a second smoothing capacitor (3b) is connected to the output of the rectifying circuit so that the rectifying direction of the diodes may be opposite to the rectifying direction of the rectifying circuit, a first load (4a) is connected in parallel with the series connection portion of the first smoothing capacitor and the diode, and a second load (4b) is connected in parallel with the series connection portion of the second smoothing capacitor and the diode. Accordingly, during a period in which a ripple voltage of the output from the rectifying circuit is high, the first and second smoothing capacitors are charged and a current flows into the first and second loads, and during a period in which a ripple voltage of the output from the rectifying circuit is low a current flows from the first smoothing capacitor through the diode to the first load and a current flows from the second smoothing capacitor through the diode to the second load, whereby a stabilized voltage of little ripple component can be supplied to the first and second loads.

9 Claims, 15 Drawing Figures

POWER SUPPLY APPARATUS

BACKGROUND OF THE INVENTION

1. Field of the Invention

The present invention relates to a power supply apparatus. More specifically, the present invention relates to an improvement in a power supply apparatus for use in a fluorescent lamp starting apparatus.

2. Description of the Prior Art

Figure 1:
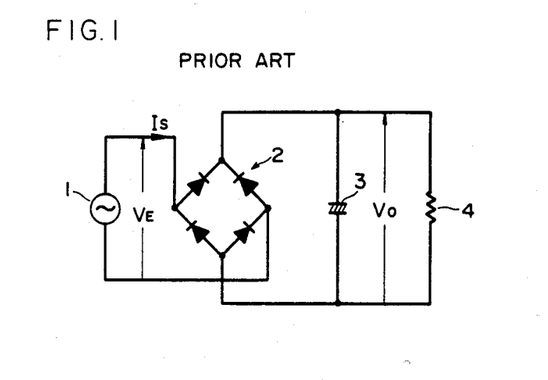
FIG. 1 is a schematic diagram of one example of a conventional power supply apparatus.
Figure 2:
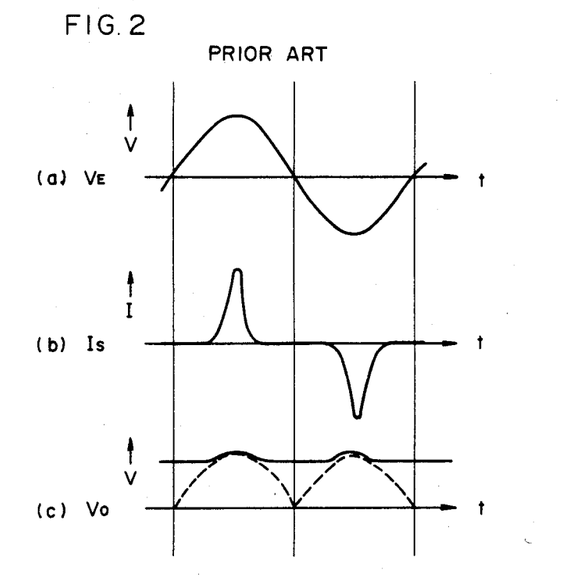
FIG. 2 is a graph showing waveforms of the electrical signals for explaining an operation of the power supply apparatus shown in FIG. 3.

FIG. 1 is a schematic diagram showing one example of a conventional power supply apparatus and FIG. 2 is a graph showing waveforms of the electrical signals at various portions in the power supply apparatus shown in FIG. 1.

Referring to FIG. 1, an alternating voltage source 1 is connected to a rectifying circuit 2 including a diode bridge, in which an alternating voltage $V_E$ shown as the waveform (a) in FIG. 2 is rectified to provide a ripple voltage shown as the waveform (c) shown by the dotted line in FIG. 2. A smoothing capacitor 3 is connected to the output of the rectifying circuit 2. The ripple voltage of the output from the rectifying circuit 2 is smoothed by the smoothing capacitor 3 and a direct current voltage $V_O$ having the ripple component removed and having an approximately constant level as shown as the waveform (c) in FIG. 2 is obtained. The direct current voltage $V_O$ thus obtained is supplied to a load 4. Meanwhile, an input current $I_S$ shown as the waveform (b) in FIG. 2 flows from the alternating current voltage source 1 to the rectifying circuit 2.

Referring to the power supply apparatus shown in FIG. 1, assuming that there is no distortion in the alternating current source voltage, the input power factor may be expressed by the following equation:

the input power factor of the power supply $p.f =$ $$\frac{I_1}{\sqrt{\sum_{n=1}^{\infty} I_n^2}} \cos \phi$$

where $I_1$ is a fundamental component when the input current $I_S$ is expanded in a Fourier series, $I_n$ is an n-th harmonic component when the input current $I_S$ is expanded in a Fourier series, and $\phi$ is a phase difference between the fundamental component $I_1$ when the input current $I_S$ is expanded in a Fourier series and the fundamental component of the source voltage $V_E$.

More specifically, as seen from the above described equation, the input power factor of the power supply apparatus shown in FIG. 1 is much less influenced by the phase difference of the current and voltage of the fundamental component and is mainly determined by the factor determinable by the distortion factor of the input current $= I_1 / \sqrt{\sum_{n=1}^{\infty} I_n^2}$ .

Therefore, a power supply apparatus of a capacitor input type in which an input current $I_S$ of a pulsive form flows involved a disadvantage that the input power factor is poor and the effective value of the input current $I_S$ becomes large. The power supply apparatus shown in FIG. 1 also involved a disadvantage that when the alternating current voltage $V_E$ from the alternating current voltage source 1 is supplied to the rectifying circuit 2 a surge current flowing into the smoothing capacitor 3 becomes large.

Recently various types of power supply apparatuses eliminating the above described disadvantages were proposed. One example is disclosed in, for example, U.S. Pat. No. 3,987,356 entitled "Controlled Capacitive Filter for Active Loads" and issued Oct. 19, 1976 to Robert Steigerwald.

Figure 3:
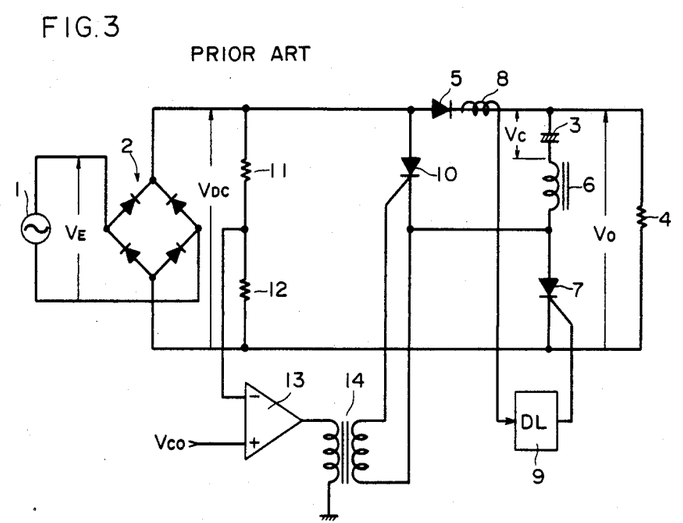
FIG. 3 is a schematic diagram showing another example of a conventional power supply apparatus.
Figure 4:
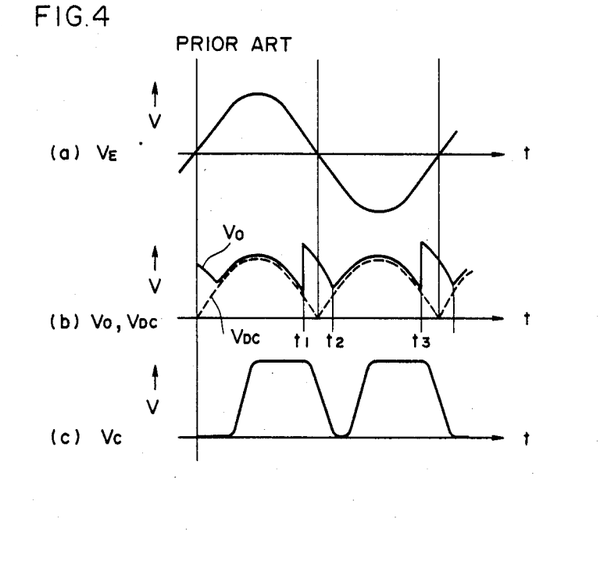
FIG. 4 is a graph showing waveforms of the electrical signals for explaining the operation of the power supply apparatus shown in FIG. 3.

FIG. 3 is a schematic diagram of a power supply apparatus in accordance with the above described U.S. Pat. No. 3,987,356 and FIG. 4 is a graph showing waveforms of electrical signals for explaining the operation of the power supply apparatus shown in FIG. 3.

Now the circuit configuration of the power supply apparatus shown in FIG. 3 will be described. An alternating current voltage source 1 is connected to the input of a rectifying circuit 2. A series connection of a diode 5, a smoothing capacitor 3, an inductance 6, and a first control switch 7 of such as a gate controlled thyristor or a gate turn-off thyristor is connected to the output of the rectifying circuit 2. The inductance 6 serves to limit an increase rate of a current flowing through the control switch 7 on the occasion of turn-on of the control switch 7 to a safe value. A load 4 is connected in parallel with the series connection of the smoothing capacitor 3, the inductance 6 and the first control switch 7. A second control switch 10 is connected in parallel with the series connection of the diode 5, the smoothing capacitor 3 and the inductance 6. The second control switch 10 may be a gate controlled thyristor, for example. A series connection of resistors 11 and 12 for dividing the output voltage $V_{DC}$ is connected to the output terminal of the rectifying circuit 2, so that the divided voltage $V_D$ divided by these resistors 11 and 12 may be applied to a comparison input terminal of a comparator 13. A reference voltage $V_{CO}$ is supplied to a reference input terminal of the comparator 13. A primary winding of a transformer 14 is connected to the output of the comparator 13 and a secondary winding of the transformer 14 is connected to the cathode and gate of the second control switch 10. A current transformer 8 is provided for detecting a current flowing through the diode 5 and the current detected by the current transformer 8 is supplied through the delay circuit 9 to the gate of the first control switch 7. The delay circuit 9 is provided for delaying the conduction timing of the control switch 7 so that the control switches 7 and 10 may not be rendered conductive simultaneously.

Now referring to FIG. 4, the operation of the power supply apparatus shown in FIG. 3 will be described. The alternating current voltage $V_E$ shown as the waveform (a) in FIG. 4 is rectified by the rectifying circuit 2 to provide a ripple voltage $V_{DC}$ shown as the waveform (b) by the dotted line in FIG. 4. The first control switch 7 is rendered conductive during the peak of the ripple voltage $V_{DC}$, so that a direct current flows from the rectifying circuit 2 through the diode 5, the smoothing capacitor 3, the inductance 6, and the control switch 7, whereby the smoothing capacitor 3 is charged. The voltage $V_{DC}$ rectified during that period is supplied through the diode 5 to the load 4. When the smoothing capacitor 3 is charged to the peak value of the ripple voltage $V_{DC}$, the current flowing into the smoothing capacitor 3 is reversed to supply energy to the load 4, whereby the control switch 7 is naturally turned off. Thereafter the ripple voltage $V_{DC}$ decreases to a given level at the timing t1 shown in the waveform (b) in FIG. 4. More specifically, if and when the divided voltage $V_{DC}$ divided by the resistors 11 and 12 becomes smaller than the reference voltage $V_C$, the comparator 13 provides an output voltage to the primary winding of the transformer 14. A voltage is induced in the secondary winding of the transformer 14 and the induced voltage is supplied to the gate of the control switch 10, whereby the second control switch 10 is turned on. Since the diode 5 has been supplied with a reverse voltage as a function of the terminal voltage of the smoothing capacitor 3 at that time, it follows that the smoothing capacitor 3 is substantially inserted in series with the load 4. Accordingly, at the timing t1 the voltage $V_O$ supplied to the load 4 rapidly increases to a level equal to a sum of the peak value of the ripple voltage, i.e. a terminal voltage of the smoothing capacitor 3 and the ripple voltage $V_{DC}$ at the timing t1. Since the inductance 6 serves to limit the increase rate of the current flowing through the control switch 10, a surge of a large current flowing into the smoothing capacitor 3 and the load 4 is prevented.

After an initial rapid increase of the voltage in the smoothing capacitor 3 at the timing t1, the smoothing capacitor 3 is discharged, whereby energy is supplied to the load 4, and is completely discharged at the timing t2. When the terminal voltage of the smoothing capacitor 3 becomes 0 V at the timing t2, the diode 5 is again forward biased to be rendered conductive, with the result that a current starts flowing into the load 4. When a load current flows through the diode 5, the flow of the current is detected by the current transformer 8 and the detected signal is supplied to the gate of the control switch 7 with a slight delay as compared with the timing t2 by means of the delay circuit 9 implemented by a one-shot multivibrator, for example, whereby the control switch 7 is turned on.

Thereafter likewise the voltage $V_{DC}$ obtained through rectification between the timings t2 and t3 is supplied to the load 2 and the smoothing capacitor 3 is charged during a period from the timing slightly delayed from the timing t2 to the timing of the peak value of the ripple voltage $V_{DC}$. When the control switch 10 is rendered conductive at the timing t3 the energy stored in the smoothing capacitor 3 is supplied to the load 4.

As described in the foregoing, in the power supply apparatus shown in FIG. 3, the voltage $V_O$ supplied to the load 4 has a low frequency ripple voltage decreased and a conduction period of the input current prolonged as shown as a waveform (b) in FIG. 4, whereby the input power factor is also improved. However, since the power supply voltage shown in FIG. 3 requires the control switches 7 and 10, the inductance 6 for preventing a surge current, the comparator 13, the delay circuit 9 and the like, a disadvantage was involved that the circuit configuration becomes considerably complicated.

SUMMARY OF THE INVENTION

Accordingly, a principal object of the present invention is to provide a power supply apparatus capable of improving the input power factor with a relatively simple structure.

The inventive power supply apparatus is structured such that an alternating voltage source is connected to a rectifying means, a series connection of a first smoothing capacitor, a diode and a second smoothing capacitor is connected to the output of the rectifying means so that the rectifying direction of the diode may be opposite to the rectifying direction of the rectifying means, a first load is connected in parallel with the series connection portion of the first smoothing capacitor and the diode, and a second load is connected in parallel with the series connection portion of the second smoothing capacitor and the diode.

Therefore, according to the present invention, the first and second smoothing capacitors are charged during a period when the ripple voltage obtained through rectification is in a high level and a current flows into the first and second loads. During a period when the ripple voltage is in a low level, a current flows from the first smoothing capacitor through the diode to the first load and a current flows from the second smoothing capacitor through the diode to the second load, whereby a ripple component can be decreased, with the result that a stabilized voltage can be supplied to the first and second loads. Furthermore, an interruption period of the input current flowing from the alternating current voltage source to the rectifying means can be shortened and the peak value of the input current can be decreased and as a result the input power factor can be improved. Furthermore, since the charging and discharging of the respective smoothing capacitors are done through the respective loads, a large surge current can be prevented from flowing by means of the impedances of the respective loads. Accordingly, any particular means for preventing a surge current from flowing need not be provided and hence a circuit configuration can be made simple.

In a preferred embodiment of the present invention, a direct current/alternating current inverter means including a resonance circuit and a switching means is provided as the first and second loads, whereby a high frequency voltage is generated and a discharge lamp is lighted by the high frequency voltage. Therefore, according to the above describe embodiment, no interruption period exists in the current flowing into the direct current/alternating current inverter means and therefore a high frequency current including little low frequency ripple component can be supplied to a discharge lamp. As a result, an illumination efficiency of a discharge lamp can be enhanced and a flickering phenomenon of the light from the lamp can be decreased. Since the peak factor of a lamp current of a discharge lamp can also be decreased, the lamp power factor can be enhanced. Furthermore, since a current flowing into the direct current/alternating current inverter means can also be decreased, the efficiency of the direct current/alternating current inverter means can also be enhanced. In addition, since the output voltage from the rectifying means is divided by the first and second smoothing capacitors and then the divided voltages are supplied to the respective switching means, the voltage supplied to the respective switching means can be halved. As a result, it becomes possible to employ a switching means of a low withstand voltage and the cost can be reduced while a reliability of the switching means can be enhanced. Furthermore, in the case where a semiconductor device is employed as the switching means, a device having an excellent high frequency characteristic can be employed.

In another embodiment of the present invention, inductance means are connected to a path of a charging current flowing through the resonance circuit and the switching means to the first and second smoothing capacitors, respectively, and a path of a discharging current flowing from the first and second smoothing capacitors to the resonance circuit and the switching means, respectively, and energy is stored in one of the inductance means by the charging current or the discharging current flowing through the switching means on the occasion of conduction of the one switching means, whereas the energy thus stored is supplied to the other switching means on the occasion of non-conduction of the switching means.

Therefore, according to the above described embodiment, the current flowing through the respective switching means can be flattened by the inductance means and a rush current can be decreased.

In a further embodiment of the present invention, a phase control means is connected between the alternating current voltage source and the rectifying means, so that a rush current can be prevented from flowing into the first and second smoothing capacitors even at the time point of each half cycle conduction of the phase control device included in the phase control means.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
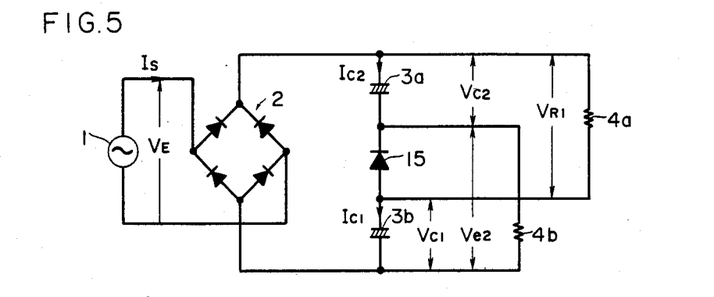
FIG. 5 is a schematic diagram of one embodiment of the present invention.
Figure 6:
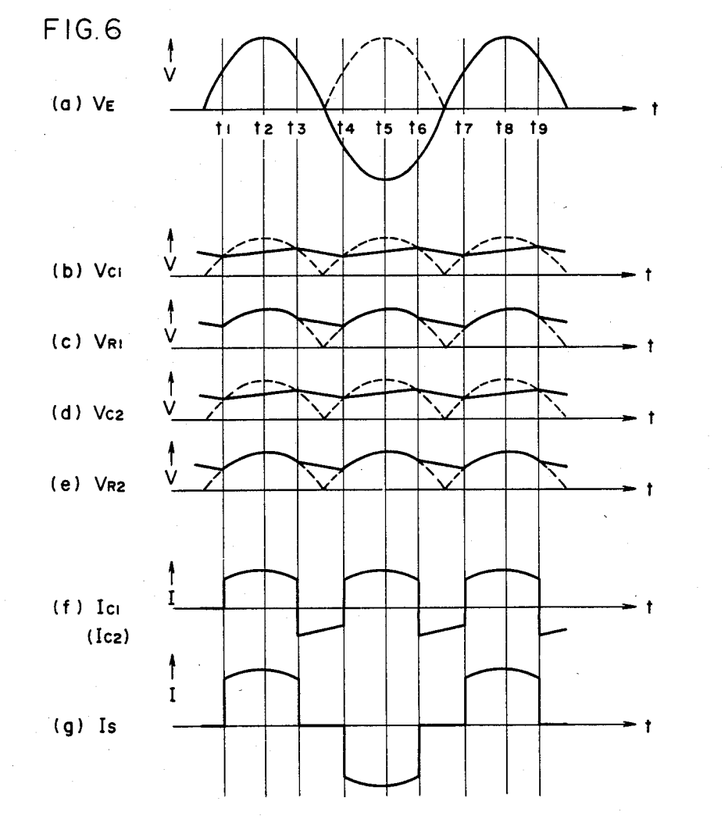
FIG. 6 is a graph showing waveforms for explaining the operation of the power supply apparatus shown in FIG. 5.

FIG. 5 is a schematic diagram of one embodiment of the present invention and FIG. 6 is a graph showing waveforms of the electrical signals for explaining the operation of the power supply apparatus shown in FIG. 5.

First referring to FIG. 5, a circuit configuration of one embodiment of the present invention will be described. An alternating current voltage source 1 is connected to the input of a rectifying circuit 2. A series connection of a first smoothing capacitor 3a, a diode 15 and a second smoothing capacitor 3b is connected to the output of the rectifying circuit 2 so that the rectifying direction of the diode 15 may be opposite to the rectifying direction of the rectifying circuit 2. A first load 4a is connected in parallel with the series connection portion of the first smoothing capacitor 3-a and the diode 15 and a second load 4b is connected in parallel with the series connection portion of the second smoothing capacitor 3b and the diode 15. The diode 15 serves to prevent the first smoothing capacitor 3a and the second smoothing capacitor 3b from being charged in series with and also serves to supply the charged voltage of the first smoothing capacitor 3a to the first load 4a and to supply the charged voltage of the second smoothing capacitor 3b to the second load 4b.

Now referring to FIG. 6, the operation of the power supply apparatus shown in FIG. 5 will be described. During the period in which the ripple voltage $V_{DC}$ is in a high level in the waveform (a) shown by the dotted line in FIG. 6, such as between the timings t1 to t3, the timings t4 to t6 and the timings t7 to t9, the first smoothing capacitor 3a is charged through the second load 4b and the second smoothing capacitor 3b is charged through the first load 4a. At that time a charging current $I_{C1}$ shown as the waveform (f) in FIG. 6 flows into the first smoothing capacitor 3a and a charging current $I_{C2}$ flows into the second smoothing capacitor 3b. A composite current of these charging currents $I_{C1}$ and $I_{C2}$ becomes an input current $I_S$ (shown as the waveform (g) in FIG. 6) flowing from the alternating current voltage source 1 to the rectifying circuit 2. During the period when the terminal voltages of the respective smoothing capacitors 3a and 3b become higher than the ripple voltage $V_{DC}$ (between the timings t3 to t4 and the timings t6 to t7), i.e. when the sum of the terminal voltages $V_{C1}$ and $V_{C2}$ of the respective smoothing capacitors 3a and 3b is larger than the ripple voltage $V_{DC}$ (the timing t3, t6 or t9 in FIG. 6), the input current $I_S$ comes not to flow from the alternating current voltage source 1 to the rectifying circuit 2. Then the diode 15 is rendered conductive and the electric charge stored in the smoothing capacitor 3a is discharged through the diode 15 and the first load 4a and the electric charge stored in the second smoothing capacitor 3b is discharged through the diode 15 and the second load 4b.

Accordingly, the voltages supplied to the respective loads 4a and 4b become the direct current voltages $V_{R1}$ and $V_{R2}$, as shown in the waveforms (c) and (e) in FIG. 6. More specifically, during the period of the timings t3 to t4 and the timings t6 to t7 of the ripple voltage $V_{DC}$, the voltage is increased due to the discharging of the respective smoothing capacitors 3a and 3b and therefore a ripple component can be decreased, whereby a stabilized voltage can be supplied to the loads 4a and 4b. The smoothing capacitors 3a and 3b continue to be charged until the timing t3 (t6, t9) even after the ripple voltage $V_{DC}$ exceeds the peak value, and the discharging is started for the first time when the timing t3 (t6, t9) is reached, and therefore the input current $I_S$ flowing from the alternating current voltage source 1 to the whole circuit has a short interruption period, as shown in the waveform (g) in FIG. 6, as compared with that of the conventional power supply apparatus shown in FIG. 1, and in addition, the peak value is low, whereby the input power factor can be improved. Furthermore, the charging and the discharging of the smoothing capacitors 3a and 3b are performed through the respective loads 4a and 4b, whereby a surge of a large current can be prevented by the impedances of these loads 4a and 4b. Accordingly, any particular means for preventing a surge of a large current need not be provided and such control switches 7 and 10 as employed in the power supply apparatus shown in FIG. 3 can be dispensed with, whereby a circuit configuration can be made simple.

In particular, such a power supply apparatus as of the above described embodiment can be advantageously employed in a case where a switching circuit and a discharge lamp are used as the loads, in which an inconvenience is caused in operation if and when an interruption period is involved in an input voltage such as in the case of an inverter circuit, a converter circuit, a chopper circuit or the like.

Figure 7A:
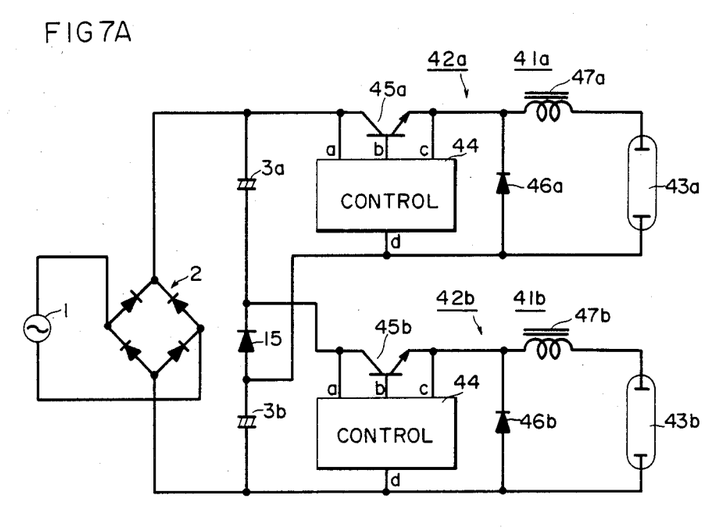
FIG. 7A is a schematic diagram showing an example in which a chopper circuit and a discharge lamp are connected as a load of the power supply apparatus shown in FIG. 5.
Figure 7B:
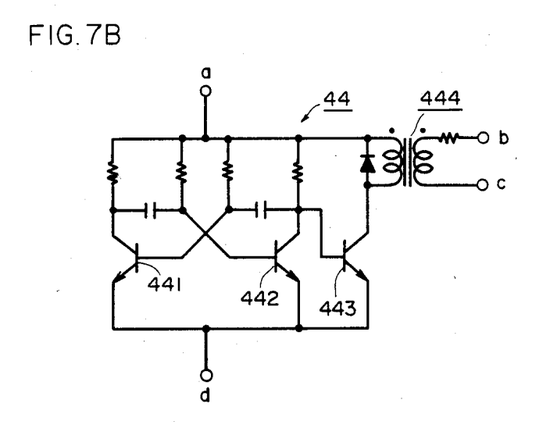
FIG. 7B is a schematic diagram of the control circuit included in the diagram shown in FIG. 7A.

FIG. 7A is a schematic diagram showing an example in which a chopper circuit and a discharge lamp are connected as an example of the loads of the power supply apparatus shown in FIG. 5 and FIG. 7B is a schematic diagram of the control circuit of the diagram shown in FIG. 7A.

First referring to FIGS. 7A and 7B, the circuit configuration of the embodiment will be described. A stepdown type chopper circuit 42a and a discharge lamp 43a are provided as the first load circuit 41a and a chopper circuit 42b and a discharge lamp 43b are provided as the second load circuit 41b. The chopper circuit 42a comprises a control circuit 44, a transistor 45a, a diode 46a, and an inductance 47a. The transistor 45a makes a switching operation in response to the pulse obtained from the control circuit 44. A series connection of the inductance 47a and the discharge lamp 43a is connected to the emitter of the transistor 45a and the diode 46a is connected in parallel with the above described series connection. The second chopper circuit 42b is structured in the same manner as that of the first chopper circuit 42a and comprises a control circuit 44, a transistor 45b, a diode 46b and an inductance 47b.

As shown in FIG. 7B, the control circuit 44 comprises an oscillating circuit including an unstable multivibrator including transistors 441 and 442 and an output transistor 443 and a transformer 444. The base of the output transistor 443 is connected to the output of the oscillating circuit and a primary winding of the transformer 444 is connected to the collector of the transistor 443. A secondary winding of the transformer 444 is connected to the base and the emitter of the transistor 45a of the first chopper circuit 42a, for example.

Now the operation of the embodiment shown in FIGS. 7A and 7B will be described. When a pulse signal is supplied from the control circuit 44 to the base of the transistor 45a included in the first chopper circuit 42a, the transistor 45a is turned on and, during the period in which the output voltage of the rectifying circuit 2 is in a high level, a direct current flows from the collector and the emitter of the transistor 45a through the inductance 47a and the discharge lamp 43a, whereby the smoothing capacitor 3b is charged. As a result, the discharge lamp 43a is lighted. Likewise, a direct current also flows to the second chopper circuit 42b and the discharge lamp 43b and the other smoothing capacitor 3a is charged, whereby the discharge lamp 43b is lighted.

When a pulse comes not to be supplied from the control circuit 44 to the base of the transistor 45a, the transistor 45a is turned off and the energy stored in the inductance 47a is supplied through the diode 46a to the discharge lamp 43a. Then during the period in which the output voltage of the rectifying circuit 2 is in a low level, the electric charge stored in one smoothing capacitor 3a is supplied through the diode 15 to the first load circuit 41a, while the electric charge stored in the other smoothing capacitor 3b is supplied through the diode 15 to the second load circuit 41b, as described previously in conjunction with FIG. 5.

As described in the foregoing, even during the period in which the output voltage of the rectifying circuit 2 is in a low level, the discharging electric charge is supplied from the smoothing capacitor 3a to the chopper circuit 42a and the discharging electric charge is supplied from the smoothing capacitor 3b to the chopper circuit 42b and therefore, there is no interruption period of the direct current, with the result that a high frequency voltage including little low frequency ripple component can be generated from the chopper circuits 42a and 42b. Accordingly, elimination of an interruption period of a current flowing into the discharge lamps 43a and 43b can enhance an illumination efficiency of the discharge lamps 43a and 43b and can decrease the peak factor of the lamp current. Therefore, the lamp power factor is enhanced and a flickering phenomenon of the light from the lamps can be decreased.

Figure 8:
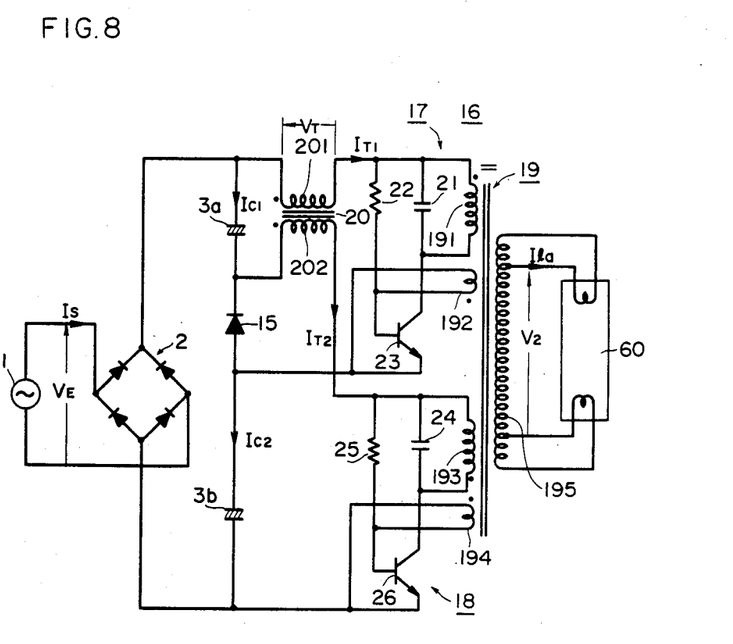
FIG. 8 is a schematic diagram of another embodiment of the present invention.
Figure 9A:
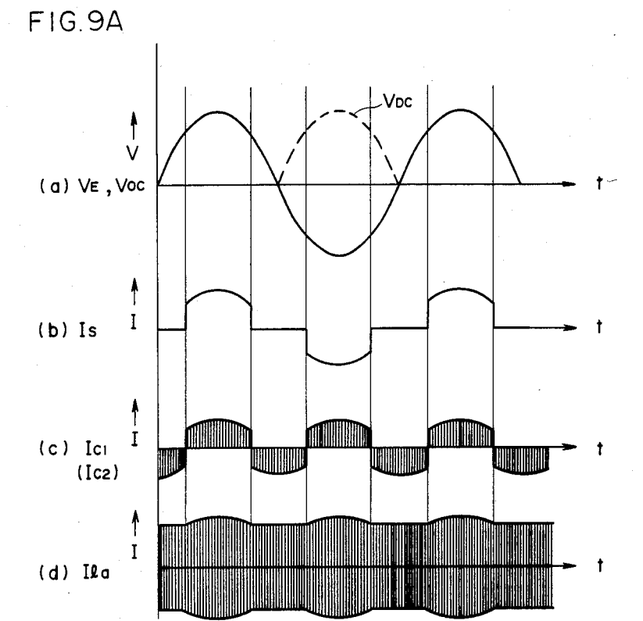
FIGS. 9A and 9B are graphs showing waveforms of the electrical signals for explaining the operation of the power supply apparatus shown in FIG. 8.
Figure 9B:
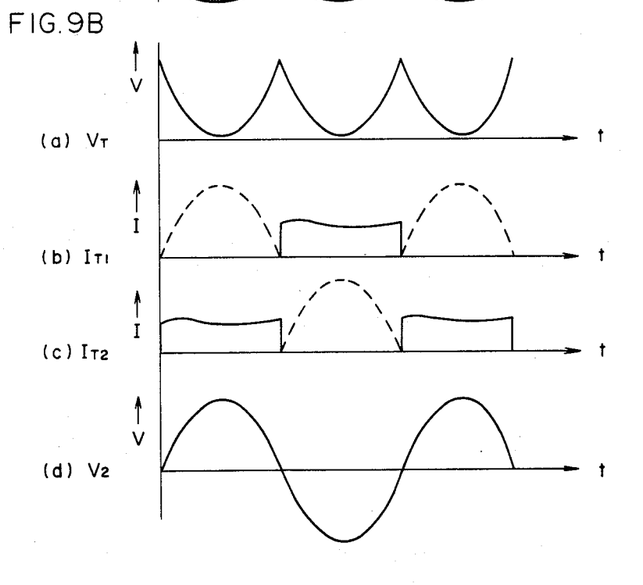

FIG. 8 is a schematic diagram of another embodiment of the present invention and FIGS. 9A and 9B are graphs for showing waveforms of the electrical signals for explaining the operation of the embodiment shown in FIG. 8.

First referring to FIG. 8, a circuit configuration of the embodiment will be described. The embodiment shown in FIG. 8 is structured such that an inverter circuit 16 and a discharge lamp 60 serving as a direct current/alternating current inverter means is connected by way of the loads 4a and 4b shown in FIG. 5. The inverter circuit 16 comprises an oscillating portion 17 serving as a first circuit means and an oscillating portion 18 as a second circuit means and an oscillating transformer 19 serving. One of the output terminals of the rectifying circuit 2 is connected through the primary winding 201 serving as the inductance means and the oscillating portion 17 to the smoothing capacitor 3b and the other of the output terminals of the rectifying circuit 2 is connected through the oscillating portion 18 and the primary winding 202 serving as the inductance means to the smoothing capacitor 3a. The primary winding 201 and the secondary winding 202 are electromagnetically coupled to constitute a transformer 20. The oscillating transformer 19 of a leakage type comprises two primary windings 191 and 193, two feedback windings 192 and 194, and a secondary winding 195. A resonance capacitor 21 included in the oscillating portion 17 is connected in parallel with one primary winding 191 of the oscillating transformer 19 so that a first resonance circuit may be formed. One terminal of the resonance circuit is connected to one end of the primary winding 201 of the above described transformer 20 and the other end of the resonance circuit is connected to the collector of the transistor 23. The base of the transistor 23 is connected through the base resistor 22 to one end of the primary winding 201 of the transformer 20 and the emitter of the transistor 23 is connected to the smoothing capacitor 3b. The feedback winding 192 is connected between the base and the emitter of the transistor 23.

A sine wave voltage is induced in the feedback winding 192 in synchronism with the resonance voltage of the frequency determined by the inductance of the primary winding 191 and the capacitance of the resonance capacitor 21. The induced voltage changes the polarity alternately in accordance with the resonance operation of the resonance circuit, whereby the base of the transistor 23 is supplied with a forward bias voltage or a reverse bias voltage.

The other oscillating portion 18 is structured in substantially the same manner as that of the above described one oscillating portion 17 and comprises a second resonance circuit including a parallel connection of a resonance capacitor 24 and a primary winding 193, and a base resistor 25 and a transistor 26. The discharge lamp 60 is connected to the secondary winding 195 of the oscillating transformer 19.

Now referring to FIGS. 9A and 9B, the operation of the embodiment shown in FIG. 8 will be described. During the period in which the output voltage of the rectifying circuit 2 is in a high level, i.e. during the period of the timings t1 to t2, the timings t3 to t4, and the timings t5 to t6, as shown as the waveform (a) in FIG. 9A, one smoothing capacitor 3b is charged through the oscillating portion 17 of the inverter circuit 16 and the smoothing capacitor 3a is charged through the other oscillating portion 18. During the period in which the output voltage of the rectifying circuit 2 is in a low level, i.e. during the period of the timings t2 to t3 and the timings t4 to t5, the input current $I_S$ does not flow from the alternating current voltage source 1 to the rectifying circuit 2 and the electric charge stored in the smoothing capacitor 3a is discharged through the diode 15 to the oscillating portion 17 and the electric charge stored in the smoothing capacitor 3b is discharged through the diode 15 to the oscillating portion 18. The above described operation is substantially the same as that of the embodiment described previously in conjunction with FIG. 5.

On the other hand, the inverter circuit 16 makes the following oscillating operation. More specifically, when the alternating current voltage source 1 is turned on, the voltage is applied to the input terminal of the inverter circuit 16 through the rectifying circuit 2 and the base current is supplied through the base resistor 22 or 25 between the base and emitter of the transistors 23 and 26. Then due to a slight diversification of the characteristic of the transistor devices per se, one of these transistors first comes to be turned on. Assuming that the transistor 23 comes to be turned on first, then a current starts flowing into the oscillating portion 17 and an oscillating voltage is generated in the primary winding 191 of the oscillating transformer 19. Voltages corresponding to that voltage appear in opposite polarities in the feedback windings 192 and 194, respectively, whereby the transistor 23 is forward biased by the feedback winding 192 and comes to be placed in a full conduction state. The transistor 26 is reverse biased by the voltage appearing in the feedback winding 194 at that time, whereby the same is kept in a non-conduction state.

When the oscillating voltage at both ends of the primary winding 191 is reversed, then the situation becomes contrary to the foregoing description and the transistor 23 is reverse biased and comes to be turned off, while the transistor 26 is forward biased and comes to be turned on. Thereafter the above described operation is repeated and the inverter circuit 16 maintains the oscillating operation and the high frequency voltage is induced in the secondary winding 195 of the oscillating transformer 19 and is supplied to the discharge lamp 60, whereby the discharge lamp 60 is lighted and the lamp current Ila shown as the waveform (d) in FIG. 9A flows.

Thus the embodiment shown in FIG. 8 makes the above described operation and the discharge lamp 60 is lighted by a high frequency and, since the transformer 20 is provided, the currents flowing into the transistors 23 and 26 are flattened to be of a rectangular waveform, whereby the switching loss of the transistors 23 and 26 is decreased.

Now the operation of the above described transformer 20 will be described. First description will be made of the period in which the value of the ripple voltage $V_{DC}$ obtained by full-wave rectification of the source voltage $V_E$ is larger than the sum of the terminal voltages of the smoothing capacitors 3a and 3b, i.e. the period in which charging current flows into the smoothing capacitors 3a and 3b (the timings t1 to t2, the timings t3 to t4 and the timings t5 to t6 in FIG. 9A). During that period, if and when the transistor 23 is turned on, a current flows through the primary winding 201 of the transformer 20, whereby the energy is stored in the primary winding 201. At the same time as the transistor 23 is turned off, the transistor 26 is turned on; however, the above described stored energy is transferred at that time to the secondary winding 202 of the transformer 20. The energy transferred at that time is discharged to a closed circuit including the secondary winding 202, the oscillating portion 18, the alternating current voltage source 1, the smoothing capacitor 3a and the secondary winding 202. Since the transistor 26 has been turned on at that time, a current flows into the secondary widing 202 through a path including the smoothing capacitor 3a, the secondary winding 202 and the oscillating portion 18, whereby energy starts being stored in the secondary winding 202.

Now, if and when the transistor 26 is turned off, the above described stored energy is transferred to the primary winding 201 and this time discharged to a closed circuit including the primary winding 201, the oscillating portion 17, the smoothing capacitor 3b, the alternating current voltage source 1 and the primary winding 201. Thereafter the above described operation is repeated and as a result the currents $I_{T1}$ and $I_{T2}$ of such rectangular waveform as shown as the waveforms (b) and (c) in FIG. 9B flows into the transistors 23 and 26, respectively, whereby a high frequency voltage $V_2$ as shown as the waveform (d) in FIG. 9B is generated between both terminals of a secondary winding 195 of the oscillating transformer 19. Since the currents $I_{T1}$ and $I_{T2}$ of a rectangular waveform thus flow into the transistors 23 and 26, a peak value of the current decreases and the loss in the transistors 23 and 26 also becomes very small. Meanwhile, the waveform shown as the waveform (a) in FIG. 9B denote the voltage $V_T$ between both terminals of the primary winding 201 and the secondary winding 202 of the transformer 20, and the waveform shown as the waveforms (b) and (c) by the dotted line in FIG. 9B denote voltages between both terminals of the respective transistors 23 and 26.

During the period in which the sum of the terminal voltages of the smoothing capacitors 3a and 3b is larger than the value of the ripple voltage $V_{DC}$, i.e. the period in which the smoothing capacitors 3a and 3b are in the process of discharging (during the timings t2 to t3 and the timings t4 to t5 in FIG. 9A), energy storage in the primary winding 201 or the secondary winding 202 is performed in the same manner as that of the above described operation as a function of the discharging current of the smoothing capacitor 3a or 3b, respectively; however, the discharge of the energy is performed through a closed circuit including the secondary winding 202, the oscillating portion 18, the smoothing capacitor 3b, the diode 15 and the secondary winding 202 or a closed circuit including the primary winding 201, the oscillating portion 17, the diode 15, the smoothing capacitor 3a, and the primary winding 201 and the currents $I_{T}1$ and $I_{T}2$ of a rectangular waveform also flow into the transistors 23 and 26.

As described in the foregoing, in the embodiment shown in FIG. 8, energy is stored in the inductance 201 or 202 as a function of the charging current or the discharging current of the smoothing capacitors 3a and 3b on the occasion of conduction of one transistor and the stored energy is discharged on the occasion of conduction of the other transistor to a closed circuit including the transistor and the voltage source (which corresponds to an alternating current voltage source if and when the smoothing capacitor is in the process of a charging operation and corresponds to the smoothing capacitor if and when the smoothing capacitor is in the process of a discharge operation). Therefore, it is possible to cause a current of a flattened rectangular waveform to flow through the transistors 23 and 26. In addition, as shown as the waveforms (b) and (c) in FIG. 9B, since the switching operation of the transistors 23 and 26 can be performed while the voltages thereacross are low, the switching loss can be decreased. Furthermore, a rush current can be restricted by the inductance 20 on the occasion of turning on of the power supply. Furthermore, in the case of the embodiment shown in FIG. 8, the period in which the current $I_S$ flows from the alternating current voltage source 1 to the rectifying circuit 2 becomes prolonged as shown as the waveform (b) in FIG. 9A and the input power factor can be improved as compared with the case where the charging current flows only in the vicinity of the peak value of such source voltage $V_E$ as shown in FIG. 1. Furthermore, in accordance with the above described embodiment, since the output voltage of the rectifying circuit 2 is divided by the smoothing capacitors 3a and 3b, the voltages applied across the transistors 23 and 26 can be decreased and hence transistors of a low withstand voltage may be used as the respective transistors 23 and 26.

Figure 10:
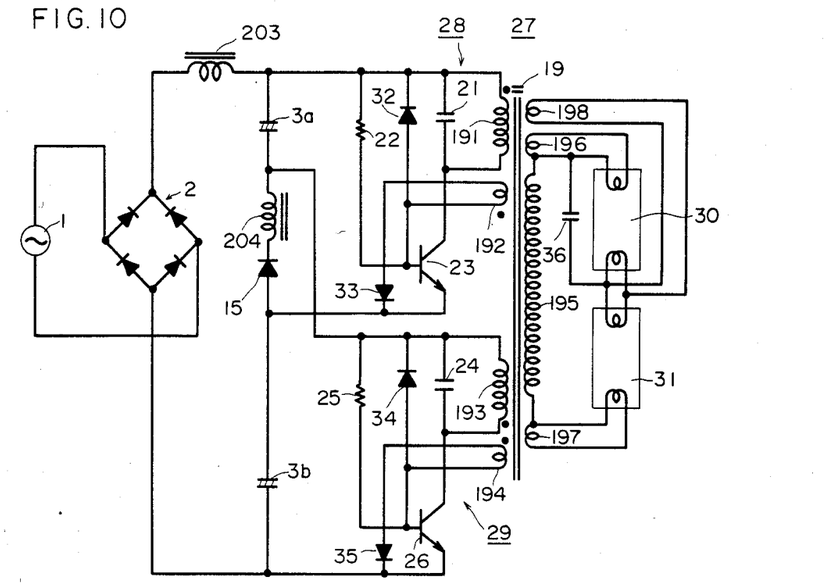
FIG. 10 is a schematic diagram of a further embodiment of the present invention.

FIG. 10 is a schematic diagram of a further embodiment of the present invention. The embodiment shown in FIG. 10 is structured in substantially the same manner as that of the embodiment shown in FIG. 8, excluding the following respects. More specifically, the transformer 20 included in the embodiment shown in FIG. 8 is replaced by an inductance 203 serving as the third inductance means, which is connected in series with the positive output terminal of the rectifying circuit 2, and an inductance 204 serving as the fourth inductance means, which is connected between the cathode of the diode 15 and one terminal of the first smoothing capacitor 3a.

Now the operation of the embodiment shown in FIG. 10 will be described. During the charge period of the smoothing capacitors 3a and 3b, if and when the transistor 23 is in a conductive state, for example, a current flows through the inductance 203, the oscillating portion 28 and the smoothing capacitor 3b, whereby energy is stored in the inductance 203. If and when the transistor 23 comes to be turned off and the transistor 26 comes to be turned on, the above described energy is discharged to a closed circuit including the inductance 203, the smoothing capacitor 3a, the oscillating portion 29, a voltage source 1 and the inductance 203 and energy comes to be stored in the inductance 203 by a charging current of the smoothing capacitor 3a flowing through a path including the inductance 203, the smoothing capacitor 3a and the oscillating portion 29. The same operation occurs when the transistor 26 changes from an on-state to an off-state and thereafter the above described operation is repeated, whereby a flattened current flows through the transistors 23 and 26.

Meanwhile, during the discharge period of the smoothing capacitors 3a and 3b, energy is stored in the inductance 204 due to a discharge current of the smoothing capacitors 3a and 3b. Discharge of energy occurs in a closed circuit not including the alternating current voltage source 1 but including the inductance 204, the smoothing capacitor 3a, the oscillating portion 28, the diode 15 and the inductance 204 or a closed circuit including the inductance 204, the oscillating portion 29, the smoothing capacitor 3b, the diode 15 and the inductance 204.

Meanwhile, in the embodiment shown in FIG. 10, a diode 33 is connected between the feedback coil 192 of the oscillating transformer 19 and the emitter of the transistor 23 and a diode 35 is connected between the feedback winding 194 and the emitter of the transistor 26. These diodes 33 and 35 serve to prevent an excessive base current from flowing into the bases of the transistors 23 and 26, thereby to reduce the loss in the base and the switching loss of the transistors 23 and 26. The diode 32 is connected between the base of the transistor 23 and one end of the primary winding 191 of the oscillating transformer 19 and the diode 34 is connected between the base of the transistor 26 and one end of the primary winding 193. These diodes 32 and 34 are provided for the purpose of increasing the switching speed of the respective transistors 23 and 26 when the transistors 23 and 26 change from an on-state to an off-state. More specifically, these diodes 32 and 34 allow the base currents to flow abruptly in the opposite direction in a closed circuit including the primary winding 191—the collector to base of the transistor 23—the diode 32 the primary winding 191 and the primary winding 193—the collector to base of the transistor 26—the diode 34—the primary winding 193, by the oscillating voltage developed in the primary windings 191 and 193 of the oscillating transformer 19, whereby cancellation of storage of carriers in the bases of the transistors 23 and 26 is expedited, whereby the switching speed of the transistors 23 and 26 is accelerated.

Furthermore, in the embodiment shown in FIG. 10, an oscillating transformer 19 of a leakage type comprises filament coils 196, 197 and 198, so that a filament voltage developed across these coils may be supplied to the discharge lamps 30 and 31 connected in series. Meanwhile, the capacitor 36 is connected between one end of the filament coil 196 and one end of the filament of the discharge lamps 30 and 31 for the purpose of improving the start of the discharge lamps 30 and 31.

As described in the foregoing, the above described embodiment is structured such that the two inductances 203 and 204 are connected to the charging path and the discharging path of the respective smoothing capacitors 3a and 3b without being electromagnetically coupled, whereby energy is stored in the inductance 203 or 204 due to a current flowing through one transistor on the occasion of conduction of this transistor and the energy is supplied to the other transistor on the occasion of non-conduction of the above described transistor, i.e. on the occasion of conduction of the other transistor. As a result, in the same manner as that of the embodiment shown in FIG. 8, the direct current flowing through the oscillating portions 28 and 29 can be flattened and a rush current on the occasion of turning on of a power supply can be decreased.

Figure 11A:
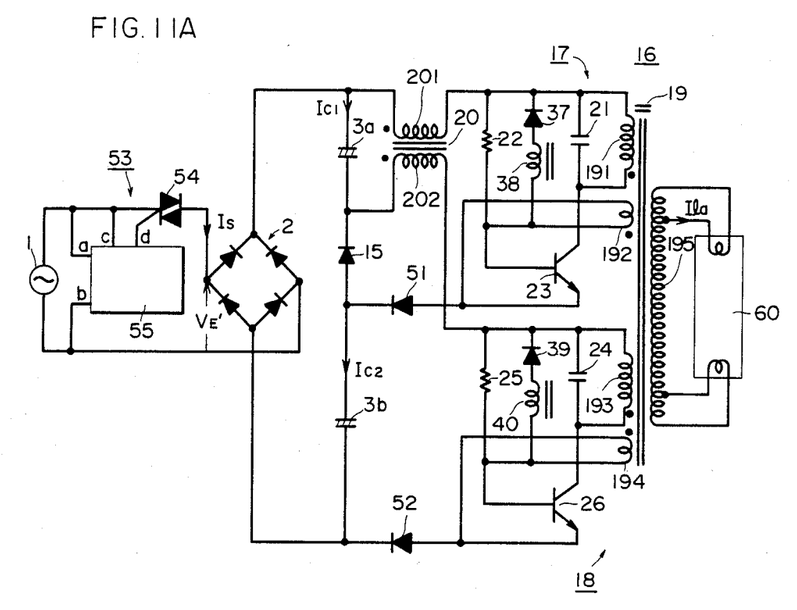
FIG. 11A is a schematic diagram of still a further embodiment of the present invention.
Figure 11B:
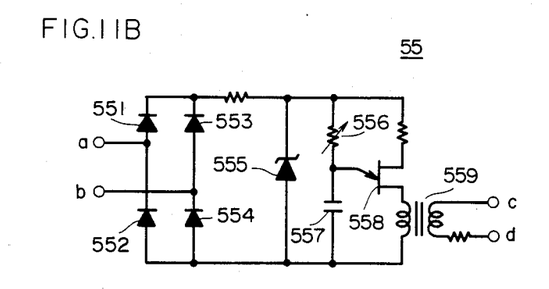
FIG. 11B is a schematic diagram of the phase control circuit in the diagram shown in FIG. 11A.
Figure 12:
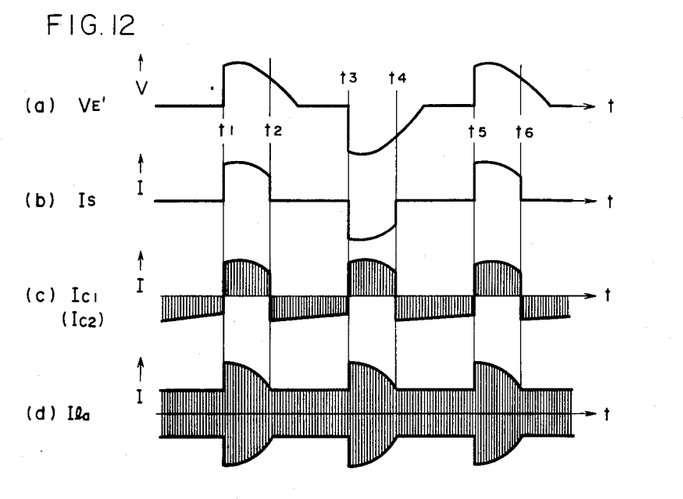
FIG. 12 is a graph showing waveforms of the electrical signals for explaining the operation of the power supply apparatus shown in FIG. 11A.

FIG. 11A is a schematic diagram of a further embodiment of the present invention, FIG. 11B is a schematic diagram of the gate control circuit 55 included in the embodiment shown in FIG. 11A, and FIG. 12 is a graph showing waveforms of the signals for explaining the operation of the embodiment shown in FIGS. 11A and 11B.

First referring to FIGS. 11A and 11B, the circuit configuration of the embodiment will be described. It is pointed out that the embodiment shown in FIG. 11A is structured in substantially the same manner as that of the embodiment shown in FIG. 8, excluding the following respects. More specifically, a phase control circuit 53 is connected between the alternating current voltage source 1 and the rectifying circuit 2. The phase control circuit 53 is provided to control the phase angle of an alternating current voltage supplied to the rectifying circuit 2 and may comprise a phase control device 54 such as a triac and a gate control circuit 55. The gate control circuit 55 comprises a full-wave rectifying circuit including diodes 551 to 554, a zener diode 555, a resistor 556, a capacitor 557, a unijunction transistor 558 and a transformer 559. The diodes 551 to 554 full-wave rectify the alternating current voltage obtained from the alternating current voltage source 1 and the zener diode 555 serves to limit the peak value of the ripple voltage obtained through full-wave rectification to a constant value. A current flows through the resistor 556 to the capacitor 557 based on the voltage obtained through full-wave rectification, whereby the capacitor 557 is charged. When the terminal voltage of the capacitor 557 reaches a predetermined level, the unijunction transistor 558 is turned on, whereby a triggering pulse is supplied through the transformer 559 to the triac 54 so that the same is rendered conductive.

A series connection of the inductance 38 and the diode 37 is connected between the base of the transistor 23 of the oscillating portion 17 and one end of the primary winding 191 and a series connection of the inductance 40 and the diode 39 is connected between the base of the transistor 26 of the oscillating portion 18 and one end of the primary winding 193. These diodes 37 and 39 expedite cancellation of storage of carriers in the bases of the transistors 23 and 26, in the same manner as that of the embodiment shown in FIG. 10, thereby to decrease the switching loss of the transistors 23 and 26. The inductances 38 and 40 also suppress the peak value of the above described abrupt reverse base current, thereby to prolong the conduction period of each of the transistors 23 and 26, thereby to further decrease the switching loss. A reverse flow preventing diode 51 is connected between the junction of the anode of the diode 15 and the smoothing capacitor 3b and the emitter of the transistor 23 and likewise a reverse flow preventing diode 52 is connected between the other end of the smoothing capacitor 3b and the emitter of the transistor 26.

Now referring to FIG. 12, the operation of the embodiment shown in FIGS. 11A and 11B will be described. If and when the alternating current voltage $V_E$ becomes the timings t1, t3 and t5 shown in the waveform (a) in FIG. 12, the gate control circuit 55 supplies a trigger pulse to the triac 54, thereby to render the same conductive. Accordingly, an alternating current voltage $V_E'$ having the phase angle controlled is supplied from the triac 54 to the rectifying circuit 2. The alternating current voltage $V_E'$ having the phase angle controlled is full-wave rectified by the rectifying circuit 2 in the same manner as that of the embodiment shown in FIG. 8 and is supplied through the primary winding 201 of the transformer 20 and the oscillating portion 17 to the smoothing capacitor 3b to charge the same and is also supplied through the secondary winding 202 of the transformer 20 and the oscillating portion 18 to the smoothing capacitor 3a to charge the same. Thereafter substantially the same operation as that described in conjunction with FIG. 8 is performed; however, by changing the phase angle of the alternating current voltage $V_E'$ being supplied to the rectifying circuit 2 by changing the resistance value of the resistor 556, for example, the level of the high frequency voltage obtained from the inverter circuit 16 can be changed and therefore the luminance of the discharge lamp 60 can be changed. Thus, the embodiment can be used as a luminance adjusting apparatus.

Meanwhile, the embodiment shown in FIG. 11A may be structured such that a change of a current flowing through the load or a voltage across the load is detected and the detected signal is fed back to the phase control circuit 55 so that the output voltage of the power supply apparatus may be a constant voltage or a power consumption in the load may be a constant power, rather than being used as a luminance adjusting apparatus.

Meanwhile, triac as the phase control device is replaced by a SCR or a transistor which is used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus, comprising:
   an alternating current voltage source (1),
   rectifying means (2) coupled to the output of said alternating current voltage source for rectifying an alternating current voltage obtained therefrom,
   a series connection including a first smoothing capacitor (3a), a diode (15), and a second smoothing capacitor (3b) being connected to said rectifying means such that the rectifying direction of said diode may be opposite to the rectifying direction of said rectifying means, a first load (4a) being connected in parallel with the series connection portion including said first smoothing capacitor and said diode, and a second load (4b) being connected in parallel with the series connection portion including said second smoothing capacitor and said diode.

2. A power supply apparatus in accordance with claim 1, wherein
said first and second loads comprise a discharge lamp starting circuit (16, 41a, 41b, 27).

3. A power suply apparatus in accordance with claim 1, wherein
said first and second loads comprise a direct current-/alternating current inverter means (16, 27).

4. A power supply apparatus in accordance with claim 3, wherein
said direct current/alternating current inverter means comprises
first circuit means (17) including a series connection of a first switching means (23) and a first resonance circuit including a first primary winding (191) and a first resonance capacitor (21), said first circuit means being and being connected in parallel with said series connection portion of said first smoothing capacitor and said diode,
second circuit means (18) including a series connection of a second switching means (26) and a second resonance circuit including a second primary winding (193) and a second resonance capacitor (24), said second circuit means being and being connected in parallel with said series connection portion of said second smoothing capacitor and said diode, said first switching means and said second switching means being adapted to make an alternate switching operation, and
a secondary winding (195) electromagnetically coupled to said first and second primary windings for providing a resonance voltage of said first and second resonance circuits.

5. A power supply apparatus in accordance with claim 4, which further comprises
inductance means (20) being inserted in a path of a charging current flowing from the output of said rectifying means to said first and second smoothing capacitors and in a path of a discharging current flowing from said first and second smoothing capacitors to said first and second switching means, and for supplying energy stored by said charging current or said discharging current flowing responsive to the switching operation of either of said first and second switching means, to said other switching means and to said resonance circuit connected in series with said other switching means on the occasion of the switching operation of the other of said first and second switching means.

6. A power supply apparatus in accordance with claim 4, which further comprises a discharge lamp (60) to be lighted by the output from said direct current/alternating current inverter means.

7. A power supply apparatus in accordance with claim 5, wherein
said inductance means comprises
first inductance means inserted in series between said first circuit means and said second smoothing capacitor,
second inductance means inserted in series between said second circuit means and said first smoothing capacitor, and
electromagnetic coupling means for electromagnetically coupling said first and second inductance means for transferring energy stored in either of said first and second inductance means to the other of said first and second inductance means.

8. A power supply apparatus in accordance with claim 5, wherein
said inductance means comprises
third inductance means (203) coupled between the output of said rectifying means and said series connection of said first smoothing capacitor, said diode and said second smoothing capacitor, and
fourth inductance means (204) coupled in series with said diode between the junction of said first smoothing capacitor and said second load, and the junction of said second smoothing capacitor and said first load.

9. A power supply apparatus in accordance with claim 1, which further comprises
phase control means (53) coupled between said alternating current voltage source and said rectifying means or between the output of said rectifying means and said series connection of said first smoothing capacitor, said diode and said second smoothing capacitor for controlling the phase angle of an alternating current voltage from said alternating current voltage source.

* * * * *

UNITED STATES PATENT AND TRADEMARK OFFICE
CERTIFICATE OF CORRECTION

PATENT NO. : 4,499,533

DATED : FEBRUARY 12, 1985

INVENTOR(S) : FUTOSHI OKAMOTO

It is certified that error appears in the above-identified patent and that said Letters Patent is hereby corrected as shown below:

```
Col. 1, line 62, "pulsive" should be --pulse--.

Col. 3, line 49, "a low" should be --a decreased low--; and
                 delete "decreased";
        line 50, "a" should be --a prolonged--; and
                 delete "prolonged";
        line 53, "voltage" should be --apparatus--.

Col. 5, line 19, "time point" should be --point in time--;
        line 33, "FIG. 3" should be --FIG. 1--.

Col. 6, line 14, "3-a" should be --3a--.

Col. 8, line 54, "primary" should be --secondary--.

Col. 10, line 10, "Ila" should be --Iℓa--;
         line 39, delete "and the secondary winding 202";
         line 41, "widing" should be --winding--;
         line 50, delete "and the primary";
         line 51, delete "winding 201".
```

UNITED STATES PATENT AND TRADEMARK OFFICE
CERTIFICATE OF CORRECTION

PATENT NO. : 4,499,533

DATED : FEBRUARY 12, 1985

INVENTOR(S) : FUTOSHI OKAMOTO

It is certified that error appears in the above-identified patent and that said Letters Patent is hereby corrected as shown below:

```
Col. 11, line 14, "3b," should be --3b and--; and
                  delete "and the secondary wind-";
         line 15, delete "ing 202";
         line 16, "15," should be --15 and--;
         line 17, "and the primary winding 201" should be
                  --.--;
         line 18, "and the" should be --The--;
         line 48, "FIG. 1" should be --FIG. 2--.

Col. 12, line 12, "29," should be --29 and--; and
                  delete "and the inductance 203";
         line 29, "28," should be --28 and--; and
                  delete "and the inductance 204";
         line 31, "3b," should be --3b and--; and
                  delete "and";
         line 32, delete "the inductance 204".

Col. 13, line 7, "electromaginetically" should be
                 --electromagnetically--.
```

UNITED STATES PATENT AND TRADEMARK OFFICE
CERTIFICATE OF CORRECTION

PATENT NO. : 4,499,533

DATED : FEBRUARY 12, 1985

INVENTOR(S) : FUTOSHI OKAMOTO

It is certified that error appears in the above-identified patent and that said Letters Patent is hereby corrected as shown below:

Col. 14, line 11, "$V_E$becomes" should be --$V_E$ becomes--;

line 41, "55" should be --53--.

Col. 15, line 31, "make" should be --perform--.

Col. 16, line 14, "first" should be --second--;
line 17, "first" should be --second--.

Signed and Sealed this

First Day of October 1985

[SEAL]

Attest:

DONALD J. QUIGG

Attesting Officer

Commissioner of Patents and
Trademarks—Designate